Patented Oct. 14, 1952

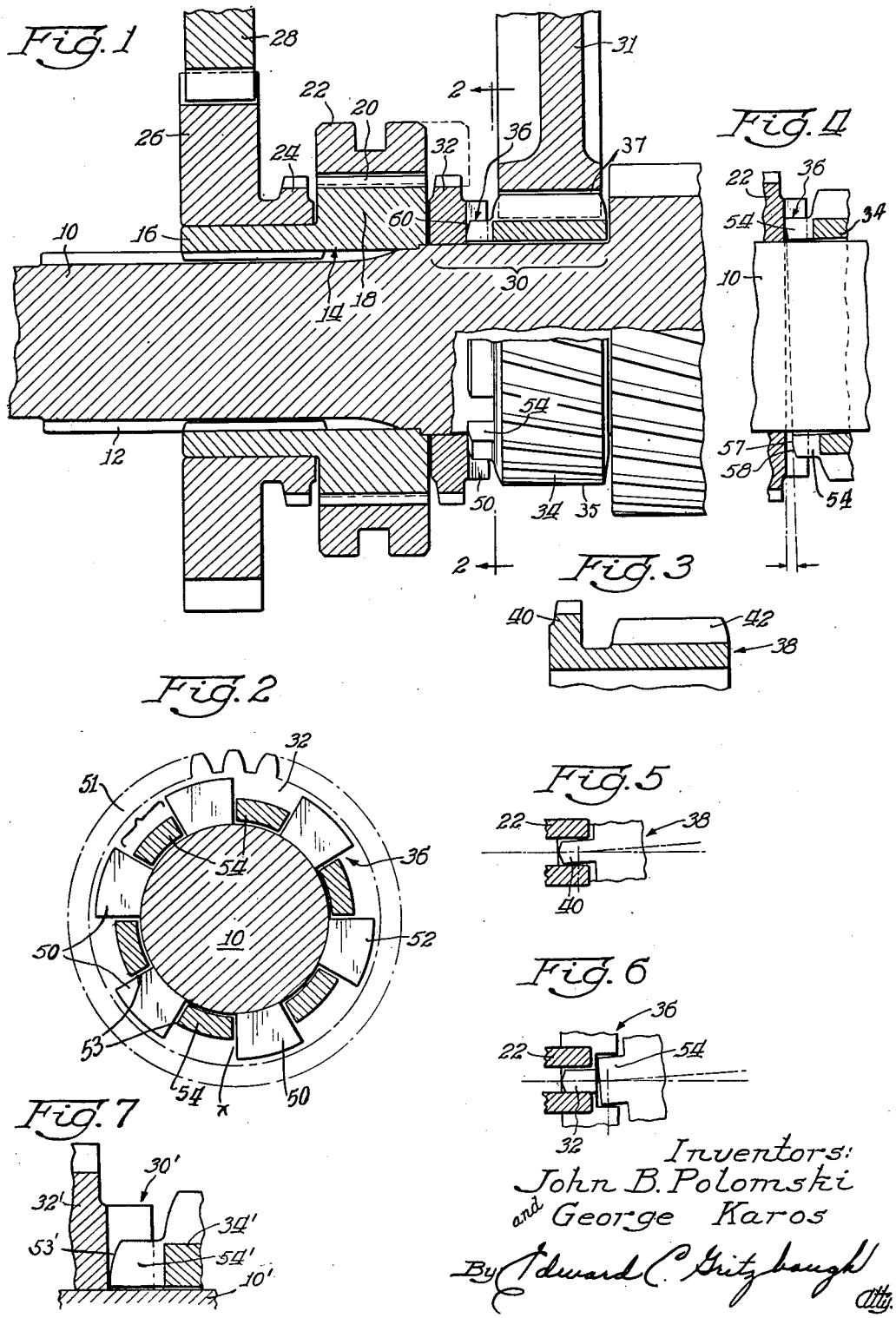

2,613,781

UNITED STATES PATENT OFFICE 2,613,781

POSITIVE CLUTCH FOR A POWER TRANSMISSION

John B. Polomski and George Karos, Detroit, Mich., assignors to Borg-Warner Corporation, Chicago, Ill., a corporation of Illinois Application March 18, 1949, Serial No. 82,238

10 Claims. (Cl. 192—67)

The improved transmission clutch comprising the present invention is primarily adapted for use in connection with tractor transmissions where high values of torque transmission are encountered. The invention, however, is capable of other uses, and the principles of the same may, with or without modification, be extended to automotive transmissions generally, as well as to stationary machine gear boxes and, in fact, to all manner of power transmission mechanisms utilizing clutching means of the direct or positive drive internal gear type.

In transmission gearing, particularly that associated with power-driven vehicles utilizing an internal combustion engine of the variable speed type as the motive source, there invariably is interposed an arrangement of speed-reduction gearing between the crank shaft of the engine and the final drive to the drive wheels of the vehicle inasmuch as it is necessary at starting and slow speeds to employ such a speed reduction by reason of the fact that the power developed by an internal combustion engine increases with the speed of the engine. Thus, to insure an effective driving torque in starting a vehicle of this character and operating the same at low speeds or under heavy loads, such a speed-reduction gearing is necessary to obtain sufficient power from the engine. It has been found that in prior constructions in which various speed ratios are selectively attainable during the transmission of driving torque, certain of the elements of the gear-reduction device tend to gradually creep out of mesh and eventually become disengaged. This tendency toward disengagement of elements, particularly under large increments of driving torque, is prevalent when one toothed member or clutching gear is enmeshed with a corresponding toothed or recessed element and wherein one or both of the elements are capable of being shifted from a disengaged position to an interlocking position or vice versa.

The above tendency toward disengagement of elements is particularly true in the case of tractor transmissions where torque ratios are apt to be abnormally high, as for example, when the tractor is pulling a load. Such disengagement of driving elements is also prevalent when torque is being applied to the power take-off shaft of the tractor when the latter is under relatively heavy load as, for example, when operating an auxiliary piece of equipment.

Numerous reasons have been advanced for this undesirable phenomenon that is attendant upon the use of shiftable gear elements in a transmission clutch assembly. Such lateral creeping of the elements may be attributed to the fact that a reasonable degree of clearance is required to permit a relative shifting or sliding of one of the toothed or recessed elements from its engaged to its disengaged position. Alternatively, a clearance between the other or non-shiftable element of the clutch assembly and the shaft on which it is mounted may exist, either due to a discrepancy in manufacturing tolerances or due to wear under prolonged use. In either instance such a clearance, particularly when the parts are engaged under heavy driving stress or torque, will result in an oscillating movement of one of the elements with respect to the other about an axis transverse to the common rotational axis of the interengaging elements. This oscillating action just referred to takes the form of a tipping, so to speak, of one of the elements with respect to the other on the shaft on which it is mounted, thus resulting in a camming action of one element on the other in such a manner as to cause the elements to be forced apart and out of engagement with each other.

Another reason tending to cause disengagement of the mating clutching elements under torsional stresses is a possible lack of parallelism between corresponding pitch lines of the clutching teeth or projections, which lack of parallelism may arise by virtue of manufacturing irregularities or distortion during heat treatment of the parts. Any looseness or clearance that may exist between the supporting shaft and the rotatable, shiftable, tooth clutching element will permit alternate diametrical, frictional or camming stresses to exist tending to cause a linear creeping of the movable element, such creeping being particularly aggravated by periodic acceleration or deceleration of the driving engine crank shaft.

The above-mentioned undesirable creeping condition may also arise by reason of misalignment of the two shafts or supports carrying the respective intermeshing clutching elements. Such misalignment between the supporting shafts would normally cause the meshing elements to creep linearly since the axes of the supports therefore, if out of alignment, would rotate with a slight angularity one with respect to the other, thus resulting in a tendency to separate the meshing elements under conditions of high torque since these elements will move in the direction of least resistance producing a theoretical spiral loci of points on the line of engagement between the mating teeth and the two elements.

Creeping and ultimate disengagement of the toothed clutch elements as outlined above are particularly characteristic of conventional transmissions of the direct or positive drive internal gear type wherein certain gears of the transmission are in constant mesh, while a separate shiftable element is employed as a means for changing the speed ratio. The difficulties heretofore explained are even more aggravated when the driven gears are of the helical type so that there is a lateral thrust imparted between the gears. Such a lateral thrust generally tends to tilt the driven gear and cause a slight misalignment between the gear and the shiftable means for establishing a drive connection therewith.

The present invention is designed to overcome the above-noted limitations that are attendant upon the use of transmissions of this character and toward this end, the invention contemplates the provision of a simple and effective means for establishing a drive between the driving and driven elements of the transmission wherein satisfactory transmission of power may be effected and wherein the tendency of the shiftable elements to become disengaged is substantially eliminated.

The invention has been illustrated in connection with a transmission embodying as one of the gear elements thereof a dual gear arrangement, including a relatively narrow spur gear section and a helical gear section, the latter being of relatively wide dimensions. Heretofore, such a dual gear construction has commonly been employed in connection with transmissions, particularly in connection with tractor transmissions. Since this dual gear unit is ordinarily of integral one-piece construction, the common tendency for the helical gear to oscillate or tip about an axis transverse to the axis of rotation of the gear, as previously outlined above, will naturally be imparted to the gear unit as a whole and, as a consequence, to the spur gear section of this unit. Since the spur gear portion of the dual unit is designed for engagement with a sliding clutch sleeve, any tendency for this portion of the dual gear unit to tilt on its supporting shaft will effect a camming action whose net result is to force the sliding clutch sleeve axially away from the dual gear and thus effect disengagement of the parts.

Lateral creeping of the slidable toothed element of the clutch construction from its engaged to its disengaged position may also occur by virtue of the fact that the sliding clutch element is loosely disposed upon the splines of the gear on which it is mounted. Since a reasonable degree of clearance is required to permit relative shifting or sliding of this element on the splines of the element on which it is mounted, it is frequently very likely that this slidable element will resort to a tipping or oscillating action relative to the clutch element with which it is associated, thus resulting in a camming action tending to cause the unstable shiftable element to creep away from the more stable clutch element.

In accordance with the present invention tipping or oscillating movement of the relatively wide helical gear section of the dual unit has been effectively isolated from the spur gear section of the dual unit by the provision of an interlocking clutch-like flexible connection between the forward or spur gear section of the dual unit and the rearward or helical gear section of the unit, this flexible connection constituting, in effect, a universal joint between the two sections of the dual gear unit while at the same time preserving the strength of the unit as a whole. It is obvious, therefore, that when such a dual gear unit is employed in connection with a transmission as one of the elements of a shiftable clutch arrangement, there will be no tendency for the spur gear section of the dual unit to rock about the transverse axis and, as a consequence, there will be no tendency of the toothed, shiftable unit with which it is in mesh to creep away and become disengaged therefrom.

The provision of a transmission clutch having a dual gear unit of the character set forth above which will effectively prevent disengagement of the clutch elements thereof being the principal object of the invention, other objects and advantages will become more readily apparent as the nature of the invention is better understood.

In the accompanying single sheet of drawings forming a part of this specification, Fig. 1 is a sectional view taken substantially vertically through a portion of a variable speed gear train or transmission embodying the improved clutch comprising the present invention;

Fig. 2 is a sectional view taken substantially along the line 2—2 of Fig. 1;

Fig. 3 is a fragmentary sectional view taken substantially transversely through a conventional dual gear unit capable of being employed in connection with the transmission of Fig. 1;

Fig. 4 is a view of a fragmentary portion of the disclosure of Fig. 1 with the parts thereof in a different position to illustrate certain principles involved in connection with the invention;

Fig. 5 is a schematic view illustrating the manner in which the conventional dual gear construction of Fig. 3 is apt to become disengaged from the shiftable, toothed, clutch element associated therewith;

Fig. 6 is a schematic view similar to Fig. 5 illustrating the manner in which the improved dual gear unit comprising the present invention prevents disengagement of interlocking gear elements; and Fig. 7 is an enlarged fragmentary view similar to Fig. 4 showing a modified form of dog tooth which may be employed in connection with the present invention.

In all of the above-described views, like characters of reference are employed to designate like parts throughout.

Referring now to the drawings in detail, and particularly to Fig. 1, the present invention has been illustrated in connection with a transmission having particular use with a gear set or system of gearing for transmitting power from an internal combustion engine of the variable speed type to the drive wheels of an automotive vehicle which may be a tractor and in which, for satisfactory operation, it is desirable to employ different speed ratios between the engine and the drive wheels. It is to be particularly understood, however, that the invention may be used in any power transmission system where a driving element and a driven element have an operative driving clutch connection therebetween. The disclosure of the transmission herein is of a fragmentary nature, the portion of the transmission shown being sufficient to illustrate the principles of the present invention.

In Fig. 1, the portion of the transmission illustrated includes a countershaft 10 adapted to be continuously driven from the crank shaft of an internal combustion engine through any suitable driving connection (not shown). The countershaft 10 is splined as at 12 and mounted on the splined portion is a driving gear member 14 having an internally splined sleeve portion 16 in meshing engagement with the splined portion 12 of the countershaft 10 and a gear portion 18 having external splines 20 formed thereon. The splines 20 are in mesh with an internally splined, shiftable clutch sleeve 22, the purpose and function of which will became apparent presently.

A dual gear including a relatively narrow gear portion 24 and a relatively wide gear portion 26 is mounted and freely rotates on the sleeve portion 16 of the gear 14. The gear portion 24 is designed for operative clutching engagement with the clutch sleeve 22 to attain one speed ratio wherein a driving connection exists from the countershaft 10 through gear member 14, clutch sleeve 22 and gear portions 24 and 26 to a gear 28 suitably connected to the driven shaft (not shown) of the transmission assembly.

A different and somewhat lower gear ratio may be attained by a drive existing from the countershaft 10 through the driving gear 14, clutch sleeve 22, and through a compound, two-piece, separable, dual gear assembly designated in its entirety at 30 (see also Figs. 2 and 4) to a gear 31, mounted on or suitably connected to the driven shaft (not shown).

The two-piece gear assembly 30, when employed in a transmission of the character illustrated herein, is designed to eliminate creeping of the clutch collar 22 and consequently disengagement of the parts outlined above, and thus this two-piece gear assembly constitutes the present invention when so employed. This two-piece, separable, dual gear construction or assembly includes a relatively narrow spur gear member or section 32 and a comparatively wider helical gear member or section 34, having helical teeth 35 thereon which mesh with mating teeth 37 formed on the gear 31, the two members or sections being inter-connected or locked in permanent driving engagement for operation as a unit by means of a coupling arrangement which permits a certain degree of flexion between the parts. The coupling arrangement is designated in its entirety at 36 and it, in effect, constitutes a universal joint connection between the two sections or parts of the dual gear assembly.

The compound, two-piece, dual gear assembly 30 is designed, when assembled in a transmission of the type illustrated, to take the place of the conventional unitary dual gear unit fragmentarily illustrated in Fig. 3 and designated in its entirety at 38, including the spur gear portion 40 and helical gear portion 42. As has previously been explained, such a gear as the unitary, dual gear 38 is mounted upon the shaft 10 as shown, and frequently, and particularly after wear has set in, there may exist between the internal bore of this gear and the periphery of the shaft 10 sufficient clearance to permit tilting of the gear in the manner illustrated in Fig. 5. This tilting not only occurs from rear to front, as shown, but also from front to rear, as well as from side to side, the tilting action occurring by a series of universal tilting increments resulting in a type of oscillation of the gear 38. This tilting action, as explained above, is particularly apt to occur when spiral gearing is employed and the spiral gears 31 and 34 are under load in torque-transmitting relation. It has been found that periodic acceleration and deceleration of the engine affects the tilting tendency of the gear 38 which tends to force the clutch sleeve 22 by a camming action out of meshing engagement with the teeth on the spur gear portion 40. In other words, tilting of the gear 38 produces an out-of-parallel condition of the pitch lines of the teeth of the gear portion 40 and the clutch sleeve 22, which under load-transmitting conditions results in a so-called spiral winding of one gear portion with respect to the other, whereby the sleeve 22 will tend to move longitudinally or creep so as to demesh the clutching gear portions.

The provision of the dual gear assembly illustrated in Figs. 2 and 4 effects a remedy for the above condition wherein the sleeve 22 creeps away from its counterpart 32. The spur gear portion 32 of the dual gear construction 36 includes a series of projecting dogs or teeth 50 of which there may be any desired number, six being illustrated in the drawings by way of example. These dogs 50 are provided with substantially flat outer surfaces 52 and the sides 53 of the dogs taper inwardly in radial fashion, although it is not essential to the invention that these sides converge on precise radial planes.

The helical gear portion 34 of the two-piece dual assembly 30 is provided with a series of mating, projecting dogs or teeth 54 which are adapted to fit in the voids or recesses 51 existing between adjacent teeth 50 on the spur gear section 32 of the assembly. The dogs or teeth 54 likewise are formed with converging sides 55 which occupy radial planes, with the over-all width of the dogs 54 being slightly less than the over-all width of the voids or recesses between the dogs or teeth 50 so that a slight clearance $x$ in a circumferential direction exists between the dogs or teeth 54 and 50, and thus a very slight and limited amount of circumferential lost-motion exists between the two parts 32 and 34 of the dual gear assembly.

The end surfaces of the dogs or teeth 54 in the inner regions 57 thereof are substantially flat and occupy a common plane transverse to the axis of rotation of the parts while the extreme outer circumferential regions thereof are inclined as at 58 to present a slight beveled area affording a clearance as shown at 60 in Fig. 1. This clearance 60 permits a slight rocking of the helical portion 34 of the gear assembly on or against the spur gear portion 32 thereof in such a manner that any tendency for the helical gear 34 to tilt or oscillate under the action of a shift in the load as accentuated by the use of helical gears will effectively isolate the rocking action to the section 34 and not transmit such a motion to the spur gear section 32.

The circumferential lost motion between the two parts 32 and 34 pointed out above has no particular significance per se. The clearance between the parts which makes this lost motion possible is resorted to of necessity however inasmuch as a rocking action of one part on the other in one plane would, in the absence of a clearance between the dog teeth 54 and their respective recesses, cause binding of the teeth in any other plane, the maximum binding effect existing in a plane at right angles to the plane of rocking movement.

It has been set forth above how the provision of a two-piece, flexible, dual gear assembly 30 as a substitute for the conventional integral dual gear assembly 38 will effectively isolate the tendency of the helical gear portion 34 to oscillate from affecting or oscillating the spur gear portion 32 of this assembly so that this latter portion will not present a camming action relative to the sliding clutch sleeve 22 tending to cause the latter to creep axially away from the section 32. The provision of such a dual gear arrangement will also prevent a camming action and consequent creeping between the two parts by virtue of additional phenomena. It has been stated previously that a certain degree of looseness of the clutch sleeve 22 on the splines of the gear 18 is necessarily and inherently present to afford sufficient clearance to permit the clutch sleeve to be moved to and from its extreme positions. As a consequence this looseness, particularly if the spur gear section 42 has a relatively tight fit on the shaft 10 as is the case when an integral gear construction is resorted to, will create an out-of-line condition between the two parts and the above referred to camming action will obtain, thus tending to cause creeping of the sliding member.

Where the dual gear construction is made in two pieces in accordance with the present invention, the spur gear section 32, being isolated from the remainder of the assembly, may possess a freedom of movement on the shaft 10 which is independent of the assembly as a whole and which, because of the relatively narrow width of this section, may permit an oscillation of such magnitude that it will naturally follow any oscillating movements of the clutch sleeve 22 so that a camming action between the two parts is avoided. In other words, with the dual gear construction of the present invention, the clutch sleeve 22 and the relatively narrow spur gear section 32 will tend to oscillate in unison and no creeping of the clutch sleeve 22 relative to the section 32 will obtain.

To summarize the above, the provision of a two-piece, dual gear construction having a floating or universal connection therebetween will in the first place effectively isolate the tendency of the helical gear section 34 to oscillate from the spur gear section 32 and thus avoid a camming action with the slidable clutch sleeve 22 and, secondly, such a dual gear construction will effectively isolate the spur gear section 32 from the helical gear section 34 so that this spur gear section will be possessed of a freedom of movement hitherto not attainable when the parts were formed in one piece. Thus the spur gear section 32, being of narrow construction and not being restricted by the movements of the helical gear section, may follow any oscillatory movements of the clutch sleeve 22 and likewise prevent a camming action tending to cause creeping movement of the latter.

In Fig. 7 a slightly modified form of the clutch arrangement is shown. In this form of the invention the forward or outer faces 53' of the dogs 54' are of arcuate configuration in cross section and, if desired, may be each in the form of spheroidal segments having a common remote center location on the axis of the countershaft 10'. By such an arrangement, an effective rocking action between the two sections 32' and 34' of the dual gear assembly 30' may occur to isolate them in their movements, one from the other, for the purposes set forth above.

The invention is not to be limited to the exact arrangement of parts shown in the accompanying drawings or described in this specification, as various changes in the details of construction may be resorted to without departing from the spirit of the invention. Only insofar as the invention has particularly been pointed out in the accompanying claims is the same to be limited.

We claim:

1. In a power transmission, a clutch assembly including a pair of aligned, interengageable clutch members, one of said clutch members being slidable axially relative to the other into and out of engagement with the latter, said members being capable of interlocking engagement with each other whereby the members rotate as a unit when the clutch is engaged, said other member being formed in two axially spaced confronting sections, one section being engageable with the slidable member when the clutch assembly is engaged and the other section of which is adapted to apply torque to or receive counter-torque from a variable load, and constantly intermeshed means on the confronting end faces of said two spaced sections, said intermeshed means having clearances between them sufficient to permit lost motion therebetween and rocking movement of one section relative to the other section.

2. In a power transmission, a clutch including interengageable clutch members, one of said members being slidable axially relative to the other into and out of engagement with the latter, said members being capable of interlocking engagement with each other whereby the members rotate as a unit when said clutch is engaged, the other member being formed in two axially spaced confronting sections, one of said sections being narrow and being engageable with the slidable member when the clutch assembly is engaged, and the other section being wider than said narrow section, a series of helical teeth formed on said relatively wide section, and a gear having mating helical teeth formed thereon and meshing with the teeth on said wide section, said gear being adapted to apply torque to or receive counter-torque from a variable load, and constantly intermeshed means on the confronting end faces of said two spaced sections, said intermeshed means having clearances between them sufficient to permit lost motion therebetween and rocking movement of one section relative to the other section.

3. In a power transmission, a clutch assembly including a pair of aligned, interengageable clutch members, one of said clutch members being slidable axially relative to the other into and out of engagement with the latter, said members being capable of interlocking engagement with each other whereby the members rotate as a unit when the clutch is engaged, said other member being formed in two axially spaced confronting sections, one of said sections being narrow and being engageable with the slidable member when the clutch assembly is engaged, and the other section being wider than said narrow section, a series of helical teeth formed on said wide section, and a gear having mating helical teeth formed thereon and meshing with the teeth on said wide section, said gear being adapted to apply torque to or receive counter-torque from a variable load, and constantly intermeshed means on the confronting end faces of said two spaced sections, said intermeshed means having clearances between them sufficient to permit lost motion therebetween and relative rocking movement between said two sections.

4. In a power transmission, a clutch assembly including a pair of aligned, interengageable clutch members, said members being capable of interlocking engagement with each other whereby the members rotate as a unit when the clutch assembly is engaged, one of said clutch members being slidable axially relative to the other into and out of engagement therewith, said other member being formed in two axially confronting sections, one of which is engageable with the slidable member when the clutch assembly is engaged and the other of which is adapted to apply torque to or receive counter-torque from a variable load, and a plurality of axially extending protuberances on a radial end face of one of said sections, means forming a plurality of recesses in a confronting end face of the other section into which said protuberances extend, there being a slight clearance between the sides of said protuberances and the sides of said recesses to permit a slight degree of circumferential lost motion to exist between the sections for the purpose of preventing binding of the sections when one section is tilted relative to the other.

5. In a power transmission, a clutch assembly including a pair of aligned, interengageable clutch members, one of said clutch members being slidable axially relative to the other into and out of engagement with the latter, said members being capable of interlocking engagement with each other whereby the members rotate as a unit when the clutch is engaged, said other member being formed in two sections, one of which is engageable with the sliding member when the clutch assembly is engaged and the other of which is adapted to apply torque to or receive counter-torque from a variable load, and a plurality of axially extending protuberances on one of said sections in the peripheral regions thereof, means forming a plurality of recesses in the other section into which said protuberances extend, the axial extent of said protuberances being substantially equal to the depth of said recesses whereby the outer faces of the protuberances bear against the bottom of said recesses, the outer faces of said protuberances being provided with portions which are inclined slightly with respect to the bottoms of said recesses to permit rocking movement between said sections.

6. In a power transmission, a clutch assembly including a pair of aligned, interengageable clutch members, one of said clutch members being slidable axially relative to the other into and out of engagement with the latter, said members being capable of interlocking engagement with each other whereby the members rotate as a unit when the clutch is engaged, said other member being formed in two sections, one of which is engageable with the slidable member when the clutch assembly is engaged and the other of which is adapted to apply torque to or receive counter-torque from a variable load, and a plurality of axially extending protuberances on one of said sections in the peripheral regions thereof, means forming a plurality of recesses in the other section into which said protuberances extend, the axial extent of said protuberances being substantially equal to the depth of said recesses whereby the outer faces of the protuberances bear against the bottom of said recesses, the outer faces of said protuberances being provided with portions which are offset with respect to the bottoms of said recesses to permit limited misalignment between said sections.

7. In a power transmission, a clutch assembly including a pair of aligned, interengageable clutch members rotatable about a common axis, one of said clutch members being slidable axially relative to the other into and out of engagement with the latter, said members being capable of interlocking engagement with each other whereby the members rotate as a unit when the clutch is engaged, the other member being formed in two sections, one of which is engageable with the slidable member when the clutch assembly is engaged and the other of which is adapted to apply torque to or receive counter-torque from a variable load, and a plurality of axially extending protuberances on one of said sections in the peripheral regions thereof, means forming a plurality of recesses in the other section into which said protuberances extend, the axial extent of said protuberances being substantially equal to the depth of said recesses whereby the outer faces of the protuberances bear against the bottom of said recesses, the outer faces of said protuberances being in the form of spheroidal segments whose common center lies on the rotational axis of the clutch members.

8. In a power transmission, a clutch assembly including a pair of aligned, interengageable clutch members, one of said clutch members being slidable axially relative to the other into and out of engagement with the latter, said members being capable of interlocking engagement with the other whereby the members rotate as a unit when the clutch is engaged, the other member being formed in two sections, one of which is engageable with the slidable member when the clutch assembly is engaged and the other of which is adapted to apply torque to or receive counter-torque from a variable load, and a plurality of protuberances formed on one of said sections, means forming recesses in the other of said sections into which said protuberances extend, the over-all cross-sectional area of said protuberances being slightly less than the over-all area of said recesses to permit limited lost motion between said sections, the axial extent of said protuberances being substantially equal to the depth of said recesses whereby the outer faces of the protuberances bear against the bottom of the recesses.

9. In a power transmission for transmissions, the combination of a driving member, a driven member axially aligned therewith, a positive type clutch for connecting the two members, one of said members being formed in two axially spaced confronting sections, and constantly intermeshed means on confronting end faces of said two sections, said intermeshed means having clearances between them sufficient to permit rocking movement of one section relative to the other section for isolating any undesirable misalignment of one section from the other.

10. In a power transmission, the combination of a driving member, a driven member axially aligned therewith, a third member in axial alignment with said first two members, a positive type clutch connecting said third member with one of said first two members, and constantly intermeshed means on the radial end face of the other of said first two members and on the confronting radial end face of said third member, said intermeshed means having clearances between them sufficient to permit lost motion therebetween and to permit relative rocking movement between said third member and before said other of the first two members for preventing the clutch from becoming disengaged under load.

JOHN B. POLOMSKI.
GEORGE KAROS.

REFERENCES CITED

The following references are of record in the file of this patent:

UNITED STATES PATENTS

| Number | Name | Date |
| --- | --- | --- |
| 1,899,514 | Lyman | Feb. 28, 1933 |
| 2,070,140 | Peterson et al. | Feb. 9, 1937 |
| 2,199,095 | Banker | Apr. 30, 1940 |
| 2,447,058 | Dence | Aug. 17, 1948 |

FOREIGN PATENTS

| Number | Country | Date |
| --- | --- | --- |
| 403,943 | Great Britain | 1933 |